(12) United States Patent
Pan

(10) Patent No.: US 10,298,077 B2
(45) Date of Patent: May 21, 2019

(54) ROTOR WITH EMBEDDED PERMANENT MAGNETS, ASSEMBLY STRUCTURE AND MOTOR COMPRISING THE SAME

(71) Applicant: Zhongshan Broad-Ocean Motor Manufacturing Co., Ltd., Zhongshan (CN)

(72) Inventor: Mingpan Pan, Zhongshan (CN)

(73) Assignee: ZHONGSHAN BROAD-OCEAN MOTOR MANUFACTURING CO., LTD., Zhongshan (CN)

(*) Notice: Subject to any disclaimer, the term of this patent is extended or adjusted under 35 U.S.C. 154(b) by 406 days.

(21) Appl. No.: 15/150,401

(22) Filed: May 9, 2016

(65) Prior Publication Data

US 2016/0254712 A1 Sep. 1, 2016

Related U.S. Application Data

(63) Continuation-in-part of application No. PCT/CN2014/072711, filed on Feb. 28, 2014.

(30) Foreign Application Priority Data

Nov. 12, 2013 (CN) .................... 2013 2 0712660 U

(51) Int. Cl.
*H02K 1/27* (2006.01)
*H02K 29/03* (2006.01)

(52) U.S. Cl.
CPC ............. *H02K 1/276* (2013.01); *H02K 29/03* (2013.01); *H02K 2213/03* (2013.01)

(58) Field of Classification Search
CPC .......... H02K 1/27; H02K 1/276; H02K 29/03; H02K 2213/03

(Continued)

(56) References Cited

U.S. PATENT DOCUMENTS 4,139,790 A 2/1979 Steen
5,864,191 A * 1/1999 Nagate .................. H02K 1/276
310/156.53

(Continued)

FOREIGN PATENT DOCUMENTS

CN 1717853 A 1/2006
CN 101056015 A 10/2007

(Continued)

*Primary Examiner* — Naishadh N Desai
(74) *Attorney, Agent, or Firm* — Matthias Scholl P.C.; Matthias Scholl

(57) ABSTRACT

A rotor, including: a rotor core and a plurality of permanent magnets. The rotor core includes an axle hole, four slots equally distributed at the outer side of the axle hole, first magnetic isolating slots, and second magnetic isolating slots. The first magnetic isolating slots are disposed at each side of each of two adjacent slots, and the second magnetic isolating slots are disposed at each side of each of the other two adjacent slots. Both the first magnetic isolating slots and the second magnetic isolating slots communicate with corresponding slots. Two lines connecting a center of the axle hole and two first magnetic isolating slots respectively at both sides of one slot form a first angle at the center, and two lines connecting the center of the axle hole and two second magnetic isolating slots respectively at both sides of one slot form a second angle at the center.

20 Claims, 4 Drawing Sheets

(58) Field of Classification Search
USPC .................................... 310/156.53, 156.56
See application file for complete search history.

(56) References Cited

U.S. PATENT DOCUMENTS

| | | | | |
|---|---|---|---|---|
| 8,102,091 B2* | 1/2012 | Ionel | ............... | H02K 1/276 |
| | | | | 310/156.53 |
| 2007/0126304 A1* | 6/2007 | Ito | ............... | H02K 1/2766 |
| | | | | 310/156.53 |
| 2013/0147304 A1 | 6/2013 | Kenji et al. | | |

FOREIGN PATENT DOCUMENTS

| | | |
|---|---|---|
| CN | 203278440 U | 11/2013 |
| JP | 2004-274826 A | 9/2004 |
| JP | 2008-199790 A | 8/2008 |

\* cited by examiner

ROTOR WITH EMBEDDED PERMANENT MAGNETS, ASSEMBLY STRUCTURE AND MOTOR COMPRISING THE SAME

CROSS-REFERENCE TO RELATED APPLICATIONS

This application is a continuation-in-part of International Patent Application No. PCT/CN2014/072711 with an international filing date of Feb. 28, 2014, designating the United States, now pending, and further claims priority benefits to Chinese Patent Application No. 201320712660.3 filed Nov. 12, 2013. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a rotor with embedded permanent magnets, an assembly structure comprising the rotor, and a motor comprising the rotor.

Description of the Related Art

In conventional rotors with embedded permanent magnets, the counter electromotive force waveform and the sine waveform thereof differ from one another, and the cogging torque ripple and the torque fluctuation are large. This results in unwanted vibrations and noises.

SUMMARY OF THE INVENTION

In view of the above-described problems, it is one objective of the invention to provide a rotor with embedded permanent magnets, an assembly structure comprising the rotor, and a motor comprising the rotor. The rotor has simple structure and is convenient for assembly, and can significantly reduce the cogging torque ripple and the torque fluctuation during driving, which is favorable for the smooth operation of the motor, and reduces the noises. An assembly structure comprising the rotor and a motor comprising the rotor also have low vibrations and noises.

To achieve the above objective, in accordance with one embodiment of the invention, there is provided a rotor, comprising: a rotor core and a plurality of permanent magnets; the rotor core comprising an axle hole in a middle thereof for receiving a rotating shaft, four slots equally distributed at an outer side of the axle hole, first magnetic isolating slots, and second magnetic isolating slots; wherein the permanent magnets are located in the four slots; the first magnetic isolating slots are disposed at each side of each of two adjacent slots in the rotor core, and the second magnetic isolating slots are disposed at each side of each of the other two adjacent slots in the rotor core; both the first magnetic isolating slots and the second magnetic isolating slots communicate with corresponding slots; two lines connecting a center of the axle hole and two first magnetic isolating slots respectively at both sides of one slot form a first angle at the center, and two lines connecting the center of the axle hole and two second magnetic isolating slots respectively at both sides of one slot form a second angle at the center, and the first angle at the center is unequal to the second angle at the center.

In a class of this embodiment, the first angle at the center is between 70 and 80 degrees, and the second angle at the center is between 55 and 65 degrees.

In a class of this embodiment, the rotor core comprises an upper section and a lower section; the upper section rotates at 180 degrees and is stacked on the lower section; the first magnetic isolating slots in the upper section communicate with the second magnetic isolating slots in the lower section; and the second magnetic isolating slots in the upper section communicate with the first magnetic isolating slots in the lower section.

In a class of this embodiment, the rotor core further comprises mounting holes at outer sides of the slots; clamping blocks are disposed at two sides of an inner wall of the slots; and the permanent magnets are located between two clamping blocks in the slots.

The invention also provides an assembly structure comprising a rotor and a stator core, the rotor comprising: a rotor core and a plurality of permanent magnets, the stator core sleeving on the rotor core, the rotor core comprising an axle hole in a middle thereof for receiving a revolving shaft, four slots equally distributed at an outer side of the axle hole, first magnetic isolating slots, and second magnetic isolating slots; wherein the permanent magnets are located in the four slots; the first magnetic isolating slots are disposed at each side of each of two adjacent slots in the rotor core, and the second magnetic isolating slots are disposed at each side of each of the other two adjacent slots in the rotor core; both the first magnetic isolating slots and the second magnetic isolating slots communicate with corresponding slots; two lines connecting a center of the axle hole and two first magnetic isolating slots respectively at both sides of one slot form a first angle at the center, and two lines connecting the center of the axle hole and two second magnetic isolating slots respectively at both sides of one slot form a second angle at the center, and the first angle at the center is unequal to the second angle at the center.

In a class of this embodiment, the first angle at the center is between 70 and 80 degrees, and the second angle at the center is between 55 and 65 degrees.

In a class of this embodiment, the first angle at the center is 74.5 degrees, and the second angle at the center is between 59.5 degrees.

In a class of this embodiment, the stator core comprises 24 winding slots, and a difference of the first angle at the center minus the second angle at the center is equal of a number resulting from dividing 360 degrees by a number of the winding slots.

In a class of this embodiment, the rotor core further comprises slotted holes at outer sides of the slots; central lines of every two slotted holes at an outer side of one slot are elongated to connect the center of the axle hole to form a first bisector and a second bisector, respectively; the first bisector and the second bisector together divide the first angle at the center and the second angle at the center into three equal parts.

In another aspect, the invention provides a motor comprising a rotating shaft, a rotor assembly, a stator assembly, and a shell assembly comprising a chamber, the rotor assembly being disposed on the rotating shaft, the stator assembly sleeving on the rotor assembly, and the stator assembly and the rotor assembly being located in the chamber. The rotor assembly comprises: a rotor core and a plurality of permanent magnets; the rotor core comprises an axle hole in a middle thereof for receiving a rotating shaft, four slots equally distributed at an outer side of the axle hole, first magnetic isolating slots, and second magnetic isolating slots; the permanent magnets are located in the four slots; the first magnetic isolating slots are disposed at each side of each of two adjacent slots in the rotor core, and the second magnetic isolating slots are disposed at each side of each of the other two adjacent slots in the rotor core; both the first magnetic isolating slots and the second magnetic isolating slots communicate with corresponding slots; two lines connecting a center of the axle hole and two first magnetic isolating slots respectively at both sides of one slot form a first angle at the center, and two lines connecting the center of the axle hole and two second magnetic isolating slots respectively at both sides of one slot form a second angle at the center, and the first angle at the center is unequal to the second angle at the center.

Advantages of the rotor with embedded permanent magnets, an assembly structure comprising the rotor, and a motor comprising the rotor of the invention are further illustrated hereinbelow.

1) The rotor core comprises an axle hole in a middle thereof for receiving a revolving shaft, four slots equally distributed at an outer side of the axle hole, first magnetic isolating slots, and second magnetic isolating slots; wherein the permanent magnets are located in the four slots; the first magnetic isolating slots are disposed at each side of each of two adjacent slots in the rotor core, and the second magnetic isolating slots are disposed at each side of each of the other two adjacent slots in the rotor core; both the first magnetic isolating slots and the second magnetic isolating slots communicate with corresponding slots. Thus, the rotor has simple structure and is convenient for assembly, and can significantly reduce the cogging torque ripple and the torque fluctuation during driving, which is favorable for the smooth operation of the motor, and reduces the noises.

2) The first angle at the center is between 70 and 80 degrees, and the second angle at the center is between 55 and 65 degrees. The difference of the first angle at the center and the second angle at the center is exactly a tooth distance, which can significantly reduce the cogging torque ripple and the torque fluctuation during driving. Thus, the motor can operate smoothly and the noises are greatly reduced.

3) The rotor core comprises an upper section and a lower section; the upper section rotates at 180 degrees and is stacked on the lower section. Through properly adjust the assembly angle of the upper section and the lower section, the cogging torque ripple and the torque fluctuation during driving are significantly reduced, and the magnetic energy utilization is improved.

4) The rotor core further comprises mounting holes at outer sides of the slots; clamping blocks are disposed at two sides of an inner wall of the slots; and the permanent magnets are located between two clamping blocks in the slots. Thus, the permanent magnets are precisely located, and are reliable and firm.

5) The first angle at the center is 74.5 degrees, and the second angle at the center is between 59.5 degrees. The stator core comprises 24 winding slots. Tests shown that, when the data are satisfied, the difference of the first angle at the center and the second angle at the center is exactly a tooth distance, which can significantly reduce the cogging torque ripple and the torque fluctuation during driving. Thus, the motor can operate smoothly and the noises are greatly reduced.

BRIEF DESCRIPTION OF THE DRAWINGS

The invention is described hereinbelow with reference to the accompanying drawings, in which.

DETAILED DESCRIPTION OF THE EMBODIMENTS

For further illustrating the invention, experiments detailing a rotor with embedded permanent magnets, an assembly structure comprising the rotor, and a motor comprising the rotor are described below. It should be noted that the following examples are intended to describe and not to limit the invention.

EXAMPLE 1

Figure 1:
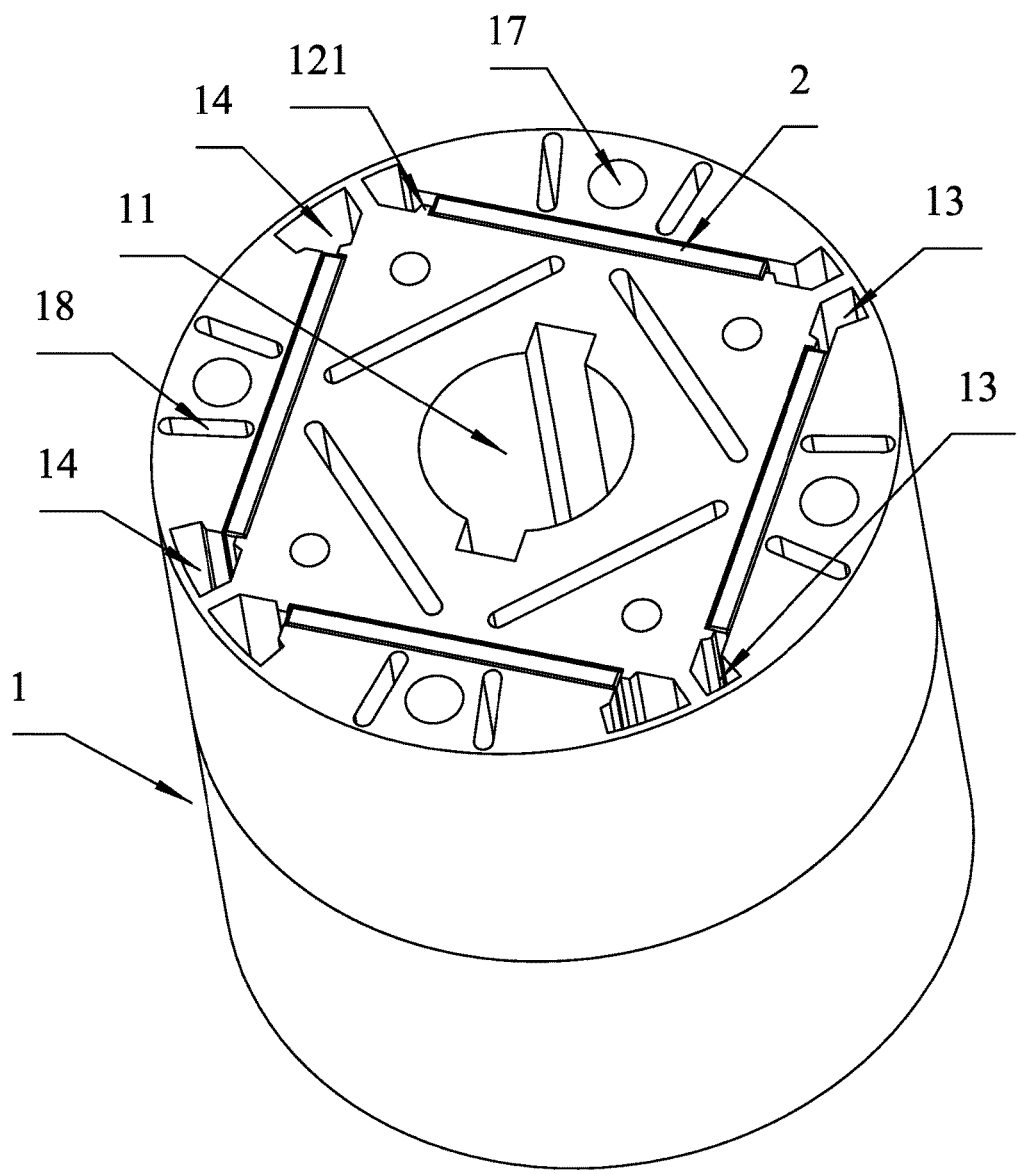
FIG. 1 is a stereogram of a rotor in accordance with one embodiment of the invention.
Figure 2:
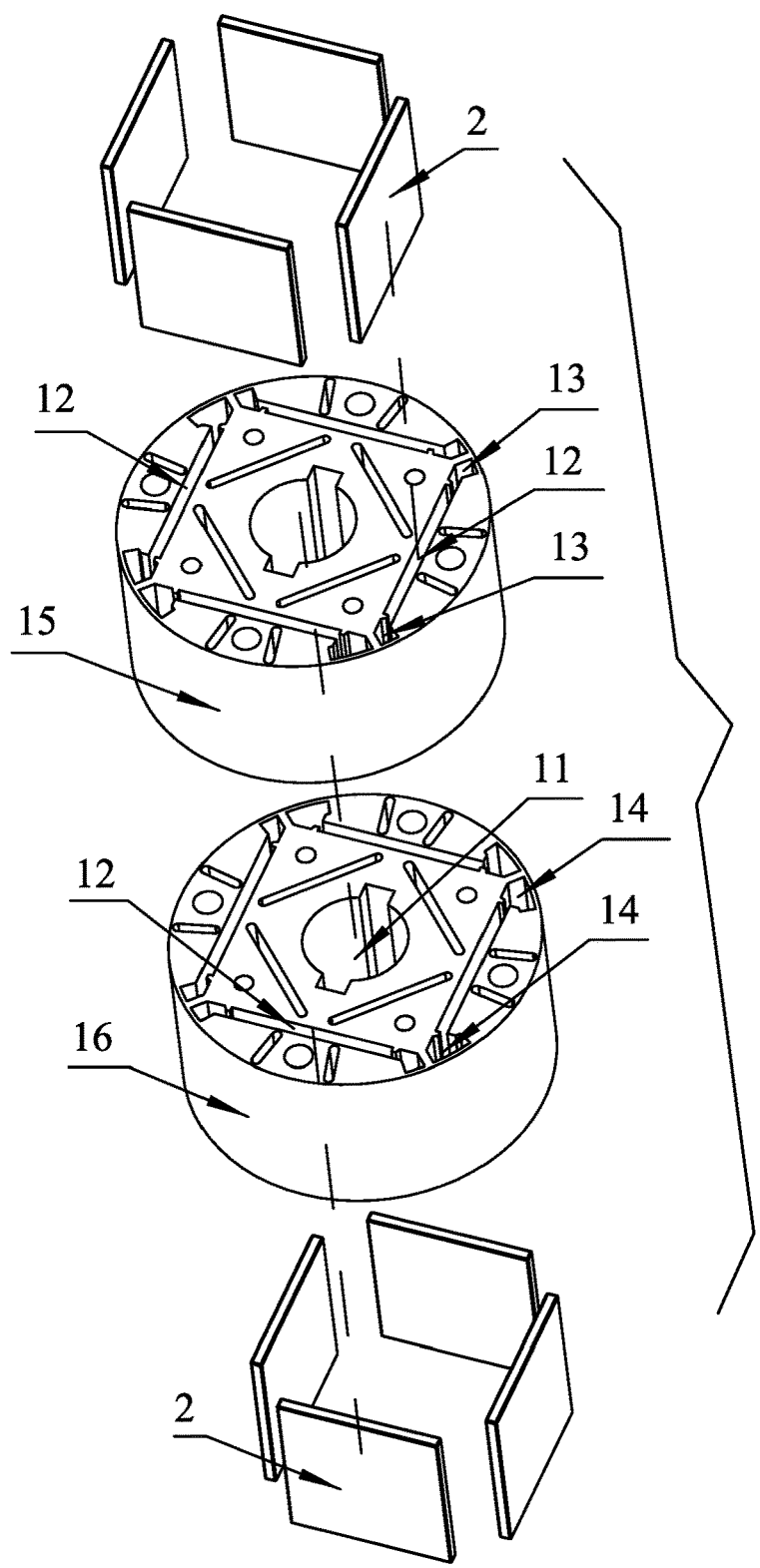
FIG. 2 is an exploded view of a rotor in accordance with one embodiment of the invention.
Figure 3:
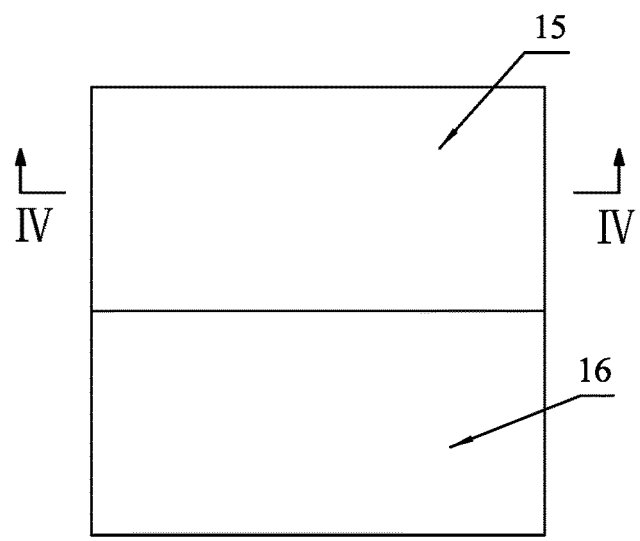
FIG. 3 is a front view of a rotor in accordance with one embodiment of the invention.
Figure 4:
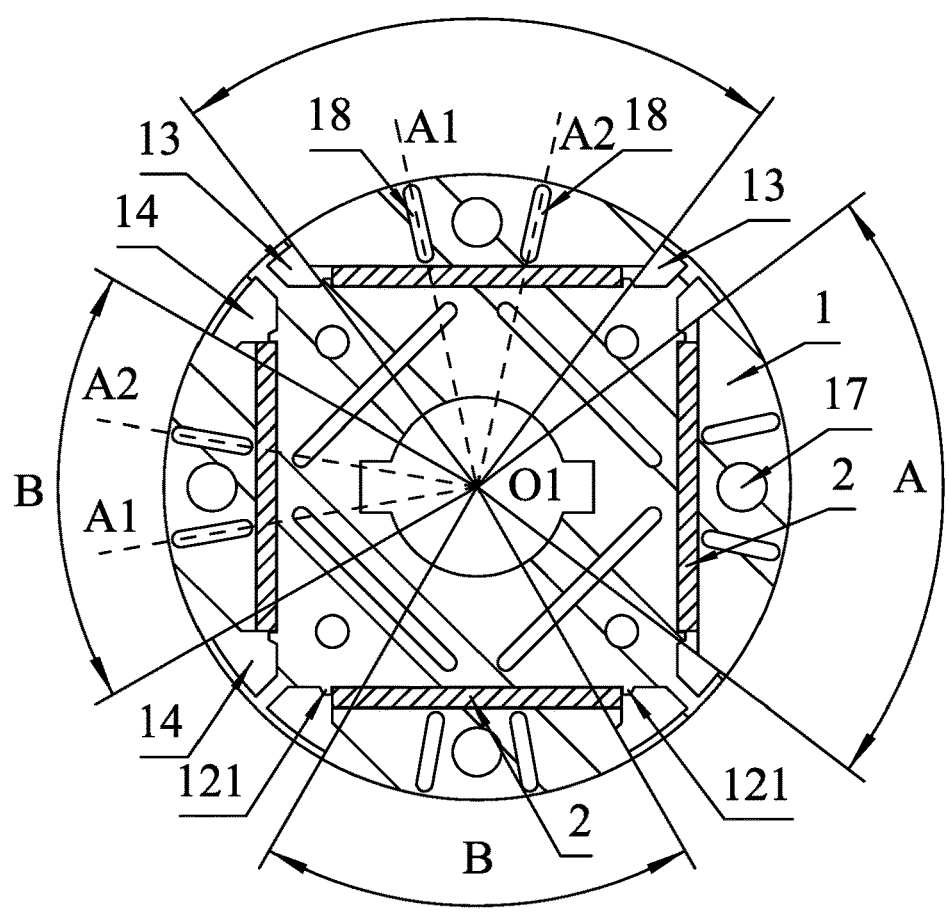
FIG. 4 is a sectional view of a rotor taken from line IV-IV in FIG. 3.

As shown in FIGS. 1-4, the invention provides a rotor comprising: a rotor core 1 and a plurality of permanent magnets 2. The rotor core comprises an axle hole 11 in a middle thereof for receiving a rotating shaft, four slots 12 equally distributed at an outer side of the axle hole 11, first magnetic isolating slots 13, and second magnetic isolating slots 14. The permanent magnets 2 are located in the four slots 12; the first magnetic isolating slots 13 are disposed at each side of each of two adjacent slots 12 in the rotor core 1, and the second magnetic isolating slots 14 are disposed at each side of each of the other two adjacent slots 12 in the rotor core 1; both the first magnetic isolating slots 13 and the second magnetic isolating slots 14 communicate with corresponding slots; two lines connecting a center of the axle hole and two first magnetic isolating slots 13 respectively at both sides of one slot form a first angle at the center A, and two lines connecting the center of the axle hole and two second magnetic isolating slots 14 respectively at both sides of one slot form a second angle at the center B, and the first angle at the center A is unequal to the second angle at the center B.

The first angle at the center A is between 70 and 80 degrees, and the second angle at the center B is between 55 and 65 degrees.

The rotor core 1 comprises an upper section 15 and a lower section 16; the upper section 15 rotates at 180 degrees and is stacked on the lower section 16; the first magnetic isolating slots 13 in the upper section 15 communicate with the second magnetic isolating slots 14 in the lower section 16; and the second magnetic isolating slots 14 in the upper section 15 communicate with the first magnetic isolating slots 13 in the lower section 16.

The rotor core 1 further comprises mounting holes 17 at outer sides of the slots 12; clamping blocks 121 are disposed at two sides of an inner wall of the slots 12; and the permanent magnets 2 are located between two clamping blocks 121 in the slots 12.

The principle of the rotor is summarized as follows. Four slots 12 are evenly distributed at the outer side of the axle hole 11. The first magnetic isolating slots 13 are disposed at each side of each of two adjacent slots 12 in the rotor core 1, and the second magnetic isolating slots 14 are disposed at each side of each of the other two adjacent slots 12 in the rotor core 1; both the first magnetic isolating slots 13 and the second magnetic isolating slots 14 communicate with corresponding slots 12. The rotor has simple structure and is convenient for assembly, and can significantly reduce the cogging torque ripple and the torque fluctuation during driving, which is favorable for the smooth operation of the motor, and reduces the noises.

EXAMPLE 2

Figure 5:
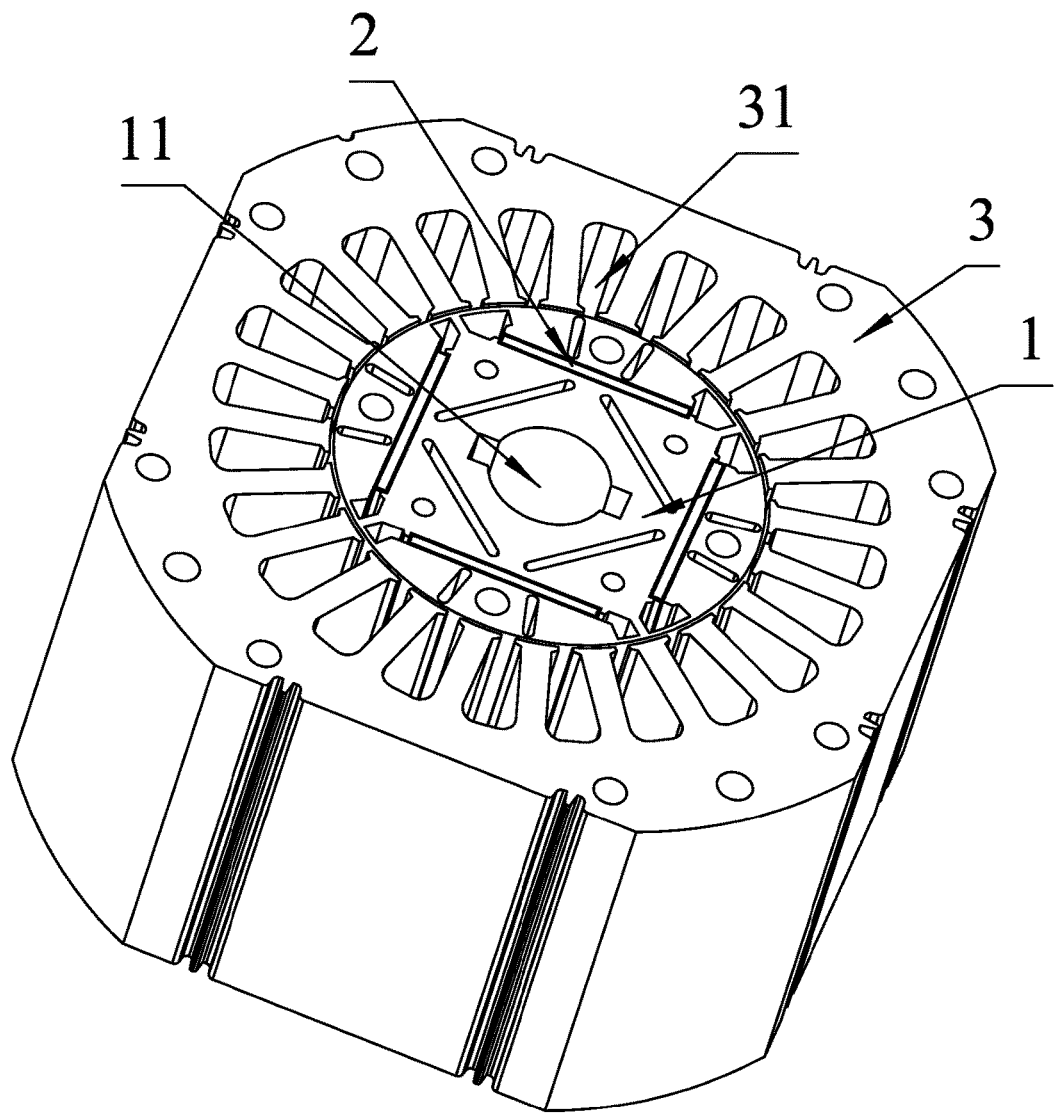
FIG. 5 is a stereogram of an assembly structure comprising the rotor in accordance with one embodiment of the invention.

As shown in FIGS. 1-5, the invention provides an assembly structure comprising a rotor and a stator core 3, the rotor comprising: a rotor core 1 and a plurality of permanent magnets 2, the stator core 3 sleeving on the rotor core 1, the rotor core 1 comprising an axle hole 11 in a middle thereof for receiving a revolving shaft, four slots 12 equally distributed at an outer side of the axle hole 11, first magnetic isolating slots, 13 and second magnetic isolating slots 14. The permanent magnets 2 are located in the four slots 12; the first magnetic isolating slots 13 are disposed at each side of each of two adjacent slots 12 in the rotor core 1, and the second magnetic isolating slots 14 are disposed at each side of each of the other two adjacent slots 12 in the rotor core 1; both the first magnetic isolating slots 13 and the second magnetic isolating slots 14 communicate with corresponding slots; two lines connecting a center of the axle hole and two first magnetic isolating slots 13 respectively at both sides of one slot form a first angle at the center A, and two lines connecting the center of the axle hole and two second magnetic isolating slots 14 respectively at both sides of one slot form a second angle at the center B, and the first angle at the center A is unequal to the second angle at the center B.

The first angle at the center A is between 70 and 80 degrees, and the second angle at the center B is between 55 and 65 degrees.

The first angle at the center A is 74.5 degrees, and the second angle at the center B is between 59.5 degrees.

The stator core 3 comprises 24 winding slots 31, and a difference of the first angle at the center minus the second angle at the center is equal of a number resulting from dividing 360 degrees by a number of the winding slots 31.

The rotor core 1 further comprises slotted holes 18 at outer sides of the slots 12; central lines of every two slotted holes 18 at an outer side of one slot are elongated to connect the center 01 of the axle hole 11 to form a first bisector A1 and a second bisector A2, respectively; the first bisector A1 and the second bisector A2 together divide the first angle at the center A and the second angle at the center B into three equal parts.

The principle of the assembly structure is summarized as follows. The stator core 3 sleeves the rotor core 1. Four slots 12 are evenly distributed at the outer side of the axle hole 11. The first magnetic isolating slots 13 are disposed at each side of each of two adjacent slots 12 in the rotor core 1, and the second magnetic isolating slots 14 are disposed at each side of each of the other two adjacent slots 12 in the rotor core 1; both the first magnetic isolating slots 13 and the second magnetic isolating slots 14 communicate with corresponding slots 12. The assembly structure has simple structure and is convenient for assembly, and has high magnetic energy utilization, which is favorable for the smooth operation of the motor, and reduces the noises.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A rotor, comprising:
   a rotor core, the rotor core comprising an axle hole in a middle thereof for receiving a rotating shaft, four slots equally distributed at an outer side of the axle hole, first magnetic isolating slots, and second magnetic isolating slots; and
   a plurality of permanent magnets;
wherein:
   the permanent magnets are located in the four slots;
   each of the four slots comprises two ends;
   the four slots are disposed around the axle hole, wherein each end of each slot is adjacent to one end of another slot;
   the four slots comprise two pairs of adjacent slots, wherein each slot in one pair of adjacent slots is disposed along the same direction as one slot in the other pair of adjacent slots;
   two first magnetic isolating slots are respectively disposed at the two ends of each slot in the one pair of adjacent slots in the rotor core, and two second magnetic isolating slots are respectively disposed at the two ends of each slot in the other pair of adjacent slots in the rotor core; both the first magnetic isolating slots and the second magnetic isolating slots communicate with corresponding slots;
   two lines connecting a center of the axle hole and two first magnetic isolating slots respectively at both ends of one slot in the one pair of adjacent slots form a first angle, and two lines connecting the center of the axle hole and two second magnetic isolating slots respectively at both ends of one slot in the other pair of adjacent slots form a second angle, and the first angle is unequal to the second angle;
   the first angle is between 70 and 80 degrees; and
   the second angle is between 55 and 65 degrees.

2. A rotor, comprising:
   a rotor core, the rotor core comprising an axle hole in a middle thereof for receiving a rotating shaft, four slots equally distributed at an outer side of the axle hole, first magnetic isolating slots, and second magnetic isolating slots; and
   a plurality of permanent magnets;
wherein:
   the permanent magnets are located in the four slots;
   the first magnetic isolating slots are disposed at each side of each of two adjacent slots in the rotor core, and the second magnetic isolating slots are disposed at each side of each of the other two adjacent slots in the rotor core; both the first magnetic isolating slots and the second magnetic isolating slots communicate with corresponding slots;
   two lines connecting a center of the axle hole and two first magnetic isolating slots respectively at both sides of one slot form a first angle at the center, and two lines connecting the center of the axle hole and two second magnetic isolating slots respectively at both sides of one slot form a second angle at the center, and the first angle at the center is unequal to the second angle at the center; and
   the rotor core comprises an upper section and a lower section; the upper section rotates at 180 degrees and is stacked on the lower section; the first magnetic isolating slots in the upper section communicate with the second magnetic isolating slots in the lower section; and the second magnetic isolating slots in the upper section communicate with the first magnetic isolating slots in the lower section.

3. The rotor of claim 1, wherein the rotor core further comprises mounting holes at outer sides of the slots; clamping blocks are disposed at the two ends of an inner wall of the slots; and the permanent magnets are located between two clamping blocks in the slots.

4. An assembly structure, comprising a rotor and a stator core, the rotor comprising: a rotor core and a plurality of permanent magnets, the stator core sleeving on the rotor core, the rotor core comprising an axle hole in a middle thereof for receiving a revolving shaft, four slots equally distributed at an outer side of the axle hole, first magnetic isolating slots, and second magnetic isolating slots; wherein:
the permanent magnets are located in the four slots;
the first magnetic isolating slots are disposed at each side of each of two adjacent slots in the rotor core, and the second magnetic isolating slots are disposed at each side of each of the other two adjacent slots in the rotor core; both the first magnetic isolating slots and the second magnetic isolating slots communicate with corresponding slots;
two lines connecting a center of the axle hole and two first magnetic isolating slots respectively at both sides of one slot form a first angle at the center, and two lines connecting the center of the axle hole and two second magnetic isolating slots respectively at both sides of one slot form a second angle at the center, and the first angle at the center is unequal to the second angle at the center;
the first angle at the center is 74.5 degrees, and the second angle at the center is between 59.5 degrees;
the stator core comprises 24 winding slots, and a difference of the first angle at the center minus the second angle at the center is equal of a number resulting from dividing 360 degrees by a number of the winding slots; and
the rotor core further comprises slotted holes at outer sides of the slots; central lines of every two slotted holes at an outer side of one slot are elongated to connect the center of the axle hole to form a first bisector and a second bisector, respectively; the first bisector and the second bisector together divide the first angle at the center and the second angle at the center into three equal parts.

5. The rotor of claim 1, wherein the first angle is 74.5 degrees, and the second angle is between 59.5 degrees.

6. The rotor of claim 1, wherein a difference between the first angle and the second angle is equal to an angle that is calculated by dividing 360 degrees by a number of the winding slots of the stator core.

7. The rotor of claim 6, wherein
a number of the winding slots of the stator core is 24; and
a difference between the first angle and the second angle is equal to 15 degrees.

8. The rotor of claim 1, wherein the rotor core further comprises two slotted holes at outer sides of each slot; and the two lines respectively connecting the two slotted holes to the center of the axle hole divide the first angle or the second angle into three equal parts.

9. The rotor of claim 2, wherein the first angle at the center is between 70 and 80 degrees, and the second angle at the center is between 55 and 65 degrees.

10. The rotor of claim 9, wherein the first angle at the center is 74.5 degrees, and the second angle at the center is between 59.5 degrees.

11. The rotor of claim 2, wherein the rotor core further comprises mounting holes at outer sides of the slots; clamping blocks are disposed at two sides of an inner wall of the slots; and the permanent magnets are located between two clamping blocks in the slots.

12. The rotor of claim 2, wherein the stator core comprises 24 winding slots, and a difference of the first angle at the center minus the second angle at the center is equal of a number resulting from dividing 360 degrees by a number of the winding slots.

13. The rotor of claim 9, wherein the stator core comprises 24 winding slots, and a difference of the first angle at the center minus the second angle at the center is equal of a number resulting from dividing 360 degrees by a number of the winding slots.

14. The rotor of claim 10, wherein the stator core comprises 24 winding slots, and a difference of the first angle at the center minus the second angle at the center is equal of a number resulting from dividing 360 degrees by a number of the winding slots.

15. The rotor of claim 2, wherein the rotor core further comprises slotted holes at outer sides of the slots; central lines of every two slotted holes at an outer side of one slot are elongated to connect the center of the axle hole to form a first bisector and a second bisector, respectively; the first bisector and the second bisector together divide the first angle at the center and the second angle at the center into three equal parts.

16. The rotor of claim 15, wherein the first angle at the center is between 70 and 80 degrees, and the second angle at the center is between 55 and 65 degrees.

17. The rotor of claim 16, wherein the first angle at the center is 74.5 degrees, and the second angle at the center is between 59.5 degrees.

18. The rotor of claim 15, wherein the stator core comprises 24 winding slots, and a difference of the first angle at the center minus the second angle at the center is equal of a number resulting from dividing 360 degrees by a number of the winding slots.

19. The rotor of claim 16, wherein the stator core comprises 24 winding slots, and a difference of the first angle at the center minus the second angle at the center is equal of a number resulting from dividing 360 degrees by a number of the winding slots.

20. The rotor of claim 17, wherein the stator core comprises 24 winding slots, and a difference of the first angle at the center minus the second angle at the center is equal of a number resulting from dividing 360 degrees by a number of the winding slots.

* * * * *